Nov. 24, 1931.         T. C. PROUTY         1,833,532
SPRING STRUCTURE
Filed June 27, 1927         3 Sheets-Sheet 1
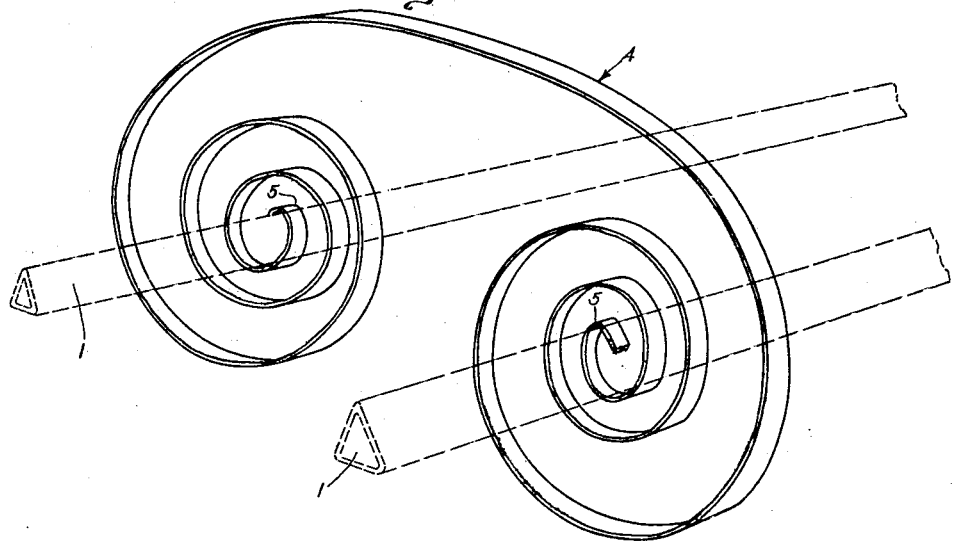
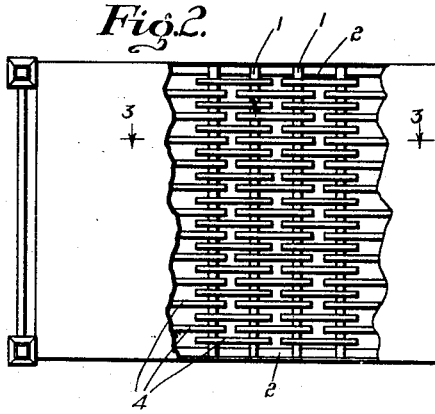
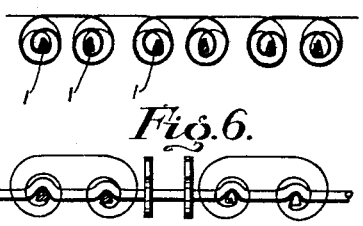
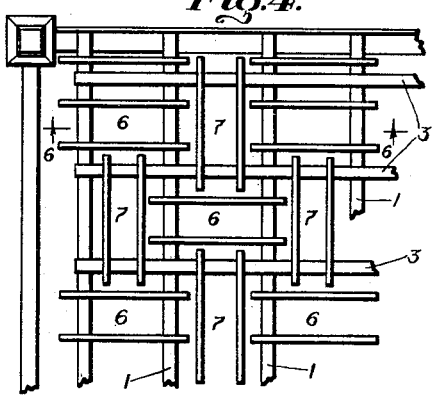
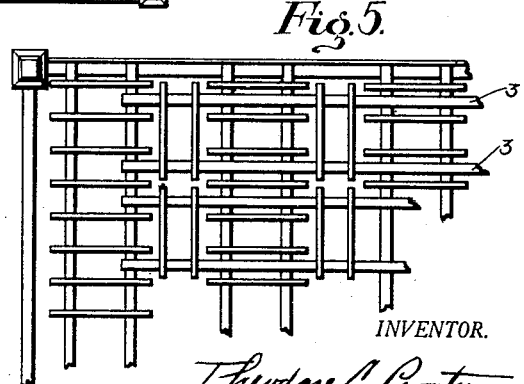
INVENTOR.
BY Theodore C. Prouty
Walter A. Scott
ATTORNEY.

Nov. 24, 1931.   T. C. PROUTY   1,833,532
SPRING STRUCTURE
Filed June 27, 1927   3 Sheets-Sheet 2

INVENTOR.
Theodore C. Prouty
BY Walter A. Scott
ATTORNEY.

Nov. 24, 1931.   T. C. PROUTY   1,833,532
SPRING STRUCTURE
Filed June 27, 1927   3 Sheets-Sheet 3
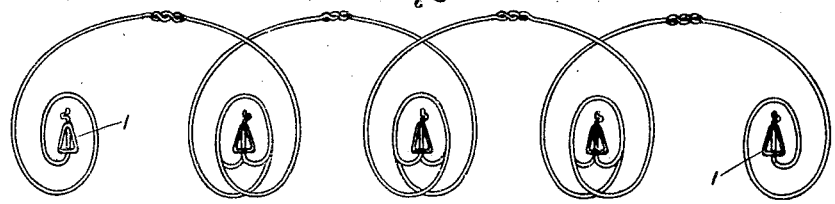
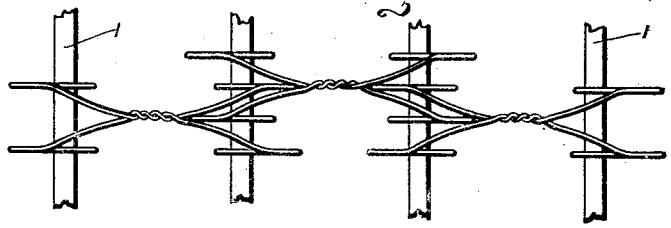
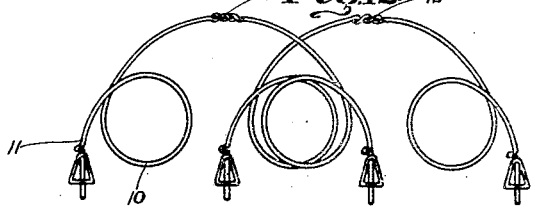
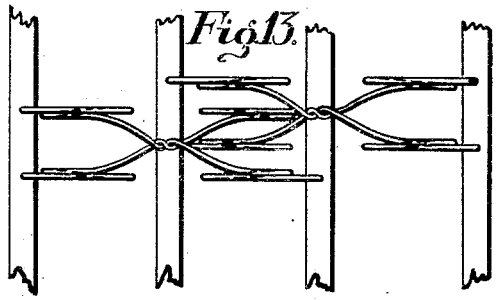
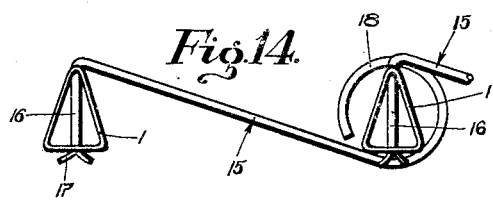
INVENTOR.
Theodore C. Prouty
BY Walter A. Scott
ATTORNEY.

Patented Nov. 24, 1931

1,833,532

UNITED STATES PATENT OFFICE

THEODORE C. PROUTY, OF HERMOSA BEACH, CALIFORNIA; WILLIS O. PROUTY ADMINISTRATOR OF SAID THEODORE C. PROUTY, DECEASED

SPRING STRUCTURE

Application filed June 27, 1927. Serial No. 201,805.

My invention is an improved spring and assemblage thereof for bedsteads, furniture, automobile seats and any other purpose requiring a similar yielding structure. Among the advantages of my improvement are simplicity of construction, great durability and uniformity in the resiliencey of all parts of the structure, due in part to the use of a large number of closely spaced resilient elements.

In the drawings:—

Figure 1 is a perspective view of one form of one of the springs together with part of the supports therefor.

Figure 2 is a plan view on a reduced scale, partly broken away to exhibit the structure of a bedstead equipped with a bed-spring formed from an assemblage of springs such as shown in Figure 1.

Figure 3 is a fragmentary sectional view on the line 3—3 of Figure 2.

Figures 4 and 5 are fragmentary plan views showing parts of bedsteads equipped with bed-springs made up of individual springs similar to that shown in Figure 1 but arranged differently from the structure shown in Figure 2.

Figure 6 is a section on the line 6—6 of Figure 4.

Figure 8 is a plain view of a part of a bed-spring formed from units similar to that shown in Figure 7.

Figure 9 is a side elevation of the structure shown in plan in Figure 8.

Figure 12 is a side elevation of springs of a modified form.

Figure 13 is a plan view of part of a bed-spring made up of the spring units shown in Figure 12.

Figure 14 is a side elevation of a connecting link used to connect together the bars upon which the springs are supported.

Figure 7:
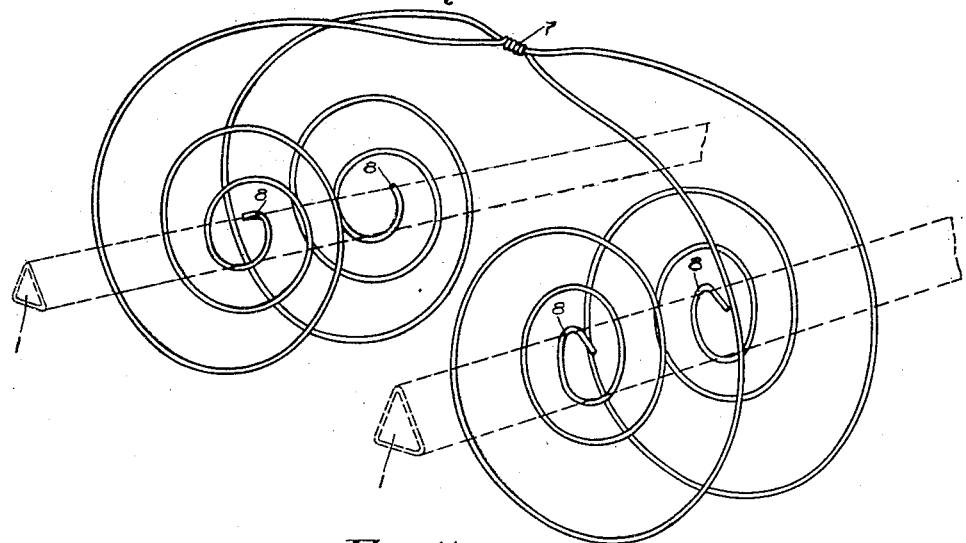
Figure 7 is a perspective view of a spring similar in principle of action to that shown in Figure 1 but constructed of wire and each spring unit made up of two sections and having four points of support instead of two as in Figure 1.

I will describe my invention in its application to a bed-spring. The use of the invention for other purposes involves the same general forms of construction adapted to the particular requirements of different uses. As applied to a bedstead the supporting members are a series of bars 1 extending transversely of the bed frame and resting on the side bars 2 thereof. With some of the assemblages of springs shown longitudinal supporting bars 3, as shown in Figures 4 and 5, will also be necessary.

In the embodiment of the invention shown in Figures 1 to 5 each spring unit 4 consists of a strip of spring metal, steel preferably, having oppositely wound coils at its ends, each coil supported at its center on one of the bars 1 or 3. The bars are preferably tubular and triangular with the base shorter than the equal sides. The bars rest upon the narrow sides at the base of the triangular section. The ends of the springs may be bent to conform to the upper angles of the bars as indicated in Figure 1 or may otherwise engage the bars for support. The width of the strips of which the springs are formed is sufficient to prevent them from tilting sidewise in use. In Figure 2 I have shown all of the springs 4 disposed lengthwise of the bed, engaging alternate pairs of the bars 1. In Figure 4 I have shown both transverse supporting bars 1 and longitudinal supporting bars 3 with pairs of springs 6 disposed lengthwise of the bed alternating with pairs 7 extending sidewise. In Figure 5 I show the springs extending in rows cross-wise of the bed, in alternate rows the individual springs being arranged respectively lengthwise and sidewise of the bed. Side elevations of the assemblages represented in Figures 2 and 4 are shown in Figures 3 and 6.

Figure 11:
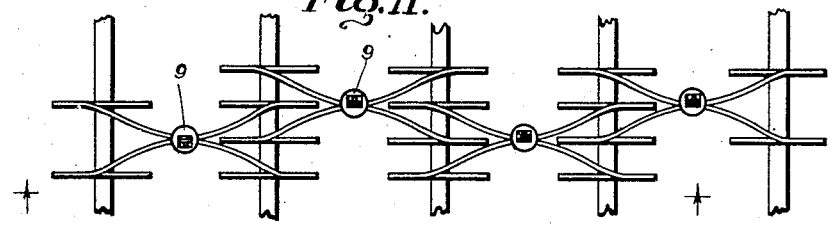
Figure 11 is a plan view of part of a bed-spring formed from the spring units shown in Figure 10.
Figure 10:
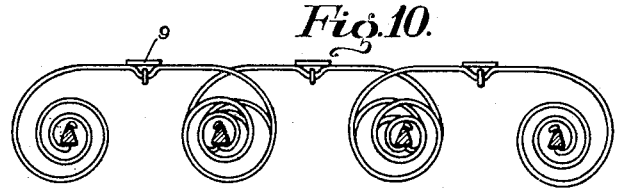
Figure 10 is a side elevation of part of a bed-spring formed from units similar to that shown in Figure 7 but with the sections of the individual springs held together by connecting members instead of being twisted together as in the form shown in Figure 7.

The spring unit shown in Figure 7 consists of two sections of spring wire, each section coiled at the ends, and the two sections united by being twisted together at 7, and the inner ends of the coils supported at the points 8 upon the bars 1. In this form each spring unit has four points of support. Figures 8 and 9 exhibit assemblages of spring units of the type shown in Figure 7. Figures 10 and 11 show a structure similar to that shown in Figures 7 to 9 but differing in that the sections of each spring unit are held together by separate members, 9, instead of being twisted together.

In the structures shown in Figures 1 to 9 the spring units are supported at the centers of the coils and the load acts in the plane of the coils, the centers of the springs being restrained against rotation about the rods in which they are supported. Springs as arranged in Figure 2 furnish a larger number of points of resistance to the load than the arrangement shown in Figures 8 and 11, but each of the spring units shown in Figures 8 and 11 affords a broader area of support owing to the meeting of the two sections of which the unit is formed.

Figures 12 and 13 are views in elevation and plan showing double spring units differing from that shown in Figure 7 in that the spring units are supported at their ends 11 with the coils, 10, between the points of support 11 and the area 12 at which the load is carried.

Among the advantages of the spring structure herein described is the fact that when used as a bed-spring no rigid outer frame is necessary, it being necessary merely to connect the supporting bars by some form of link that will keep them properly spaced. I have shown such a link 15 in Figure 14, one end, 16, being bent downwardly and passed through perforations through the apex and base of the supporting bar 1 and headed over at 17 while the opposite end is formed into an eye 18 that encircles the next adjoining bar 1. The parts 16 of the links are between the eyelets 18 and the ends of the bars 1 and thereby serve as keepers to hold the eyelets in place. A bed-spring so constructed needs no outer frame, the load being transmitted directly from the ends of the bars 1 to the side rails 2 of the bedstead as shown in Figures 2, 4 and 5. When the spring units are assembled as shown in Figure 2 the entire bed-spring can be rolled up for transportation and handling. An additional advantage of my improved bed-spring when the spring units are constructed and assembled in any of the ways shown and described lies in the possibility of spacing the spring units as desired, close together to form a relatively stiff and resistant bedspring or farther apart with fewer spring units to make a softer and more yielding spring structure. Likewise the spring units may be spaced closely at the parts which bear the greatest weight and farther apart elsewhere. While such selected spacing of the springs would ordinarily be done when the bed-spring is manufactured it is quite possible and practical to change the number and spacing of the springs after the structure has been completed, or in an old bed-spring to replace the spring units that have become flattened and lost their resiliency.

My improved spring structure differs from those in common use in that the load is carried in the plane of the spring coils instead of transversely thereof as is the case when helical springs are used. The use of flat coils carrying the load in the plane of the coils as in my improved structure renders it possible to use a larger number of spring units and thereby to support the load at a greater number of points with less resistance at each point. A relatively thin pad laid over my improved bed-spring serves to effectually distribute the resistance of the separate spring units and to form a smooth uniformly resistant surface, thereby rendering a thick and heavy mattress unnecessary.

I claim:

1. A bed-spring comprising a series of supporting bars adapted to rest at their ends upon the rails of a bedstead, a plurality of independent spring units, each unit comprising a pair of integrally connected coils lying in the same plane, the ends of said units resting on said bars with the plane of said coils parallel to the direction of application of the load, and links rotatably engaging said bars adjacent their ends to permit the structure to be folded upon itself and to space said bars when unfolded.

2. A bed-spring comprising a series of supporting bars adapted to rest at their ends upon the rails of a bedstead, and a plurality of independent spring units, each unit being formed of resilient material and having at each end, a flat spiral coil having a number of spaced turns, the turns in each spiral being spaced from the preceding turns, the inner ends of each coil being connected to a corresponding supporting bar, and the outer ends of the last turn being connected by a resilient member forming a load sustaining bow merging into the ends of the last turns of the coils with an uninterrupted continuity; and the respective axes of the spirals being spaced apart and parallel.

In testimony whereof, I have subscribed my name.

THEODORE C. PROUTY.